United States Patent
Pallares-Lopez et al.

(10) Patent No.: US 8,477,763 B2
(45) Date of Patent: Jul. 2, 2013

(54) SERVICE ADAPTATION IN AN IP MULTIMEDIA SUBSYSTEM NETWORK

(75) Inventors: Miguel-Angel Pallares-Lopez, Madrid (ES); Nuria Esteban-Vares, Aranjuez (ES); Stephen Terrill, Madrid (ES); Jose-Javier Díez-García, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 838 days.

(21) Appl. No.: 12/518,631

(22) PCT Filed: Dec. 11, 2006

(86) PCT No.: PCT/EP2006/069557
§ 371 (c)(1),
(2), (4) Date: Jun. 10, 2009

(87) PCT Pub. No.: WO2008/071225
PCT Pub. Date: Jun. 19, 2008

(65) Prior Publication Data
US 2010/0020790 A1  Jan. 28, 2010

(51) Int. Cl.
*H04L 12/66* (2006.01)
(52) U.S. Cl.
USPC .......................................................... 370/352
(58) Field of Classification Search
None
See application file for complete search history.

(56) References Cited

U.S. PATENT DOCUMENTS

| | | | |
|---|---|---|---|
| 7,366,163 B1 * | 4/2008 | Samarasinghe et al. ...... | 370/352 |
| 7,522,613 B2 * | 4/2009 | Rotsten et al. ................. | 370/400 |
| 7,684,786 B2 * | 3/2010 | Hurtta et al. .................. | 455/411 |
| 7,689,234 B2 * | 3/2010 | Horvath et al. ................ | 455/466 |
| 7,817,617 B2 * | 10/2010 | Chang et al. ................... | 370/351 |
| 7,822,035 B2 * | 10/2010 | Mutikainen et al. .......... | 370/392 |
| 7,877,487 B2 * | 1/2011 | Cai et al. ........................ | 709/227 |
| 7,912,042 B2 * | 3/2011 | Falkena et al. ................ | 370/352 |
| 7,940,780 B2 * | 5/2011 | Yamamoto et al. ........... | 370/400 |
| 8,046,479 B2 * | 10/2011 | Einarsson et al. ............. | 709/230 |
| 8,111,712 B2 * | 2/2012 | Mutikainen et al. .......... | 370/466 |
| 8,134,955 B2 * | 3/2012 | Rahman et al. ................ | 370/328 |
| 8,134,956 B2 * | 3/2012 | Siegel et al. ................... | 370/328 |
| 2003/0187992 A1 * | 10/2003 | Steenfeldt et al. ............ | 709/227 |
| 2004/0088419 A1 * | 5/2004 | Westman ....................... | 709/227 |
| 2004/0117657 A1 * | 6/2004 | Gabor et al. ................... | 713/201 |
| 2004/0223489 A1 * | 11/2004 | Rotsten et al. ................. | 370/352 |
| 2005/0132412 A1 * | 6/2005 | Richardson et al. .......... | 725/100 |
| 2005/0237978 A1 * | 10/2005 | Segal ............................. | 370/331 |
| 2007/0076691 A1 * | 4/2007 | Varney et al. ................. | 370/352 |
| 2007/0207805 A1 * | 9/2007 | Pallares Lopez et al. ..... | 455/436 |
| 2007/0253365 A1 * | 11/2007 | Hedberg et al. ............... | 370/329 |
| 2007/0253428 A1 * | 11/2007 | Kumarasamy et al. .. | 370/395.21 |
| 2007/0263822 A1 * | 11/2007 | Chang et al. ............. | 379/202.01 |
| 2008/0101412 A1 * | 5/2008 | Schwagmann et al. ....... | 370/474 |
| 2008/0118047 A1 * | 5/2008 | Nachum ................. | 379/210.01 |
| 2008/0162705 A1 * | 7/2008 | Cai et al. ....................... | 709/228 |
| 2008/0189414 A1 * | 8/2008 | Astrom et al. ................. | 709/225 |
| 2008/0219250 A1 * | 9/2008 | Mutikainen et al. .......... | 370/389 |

(Continued)

*Primary Examiner* — Otis L Thompson, Jr.

(57) ABSTRACT

A method of operating a Call Session Control Function node within an IP Multimedia Subsystem network. The method comprises establishing a first session corresponding to a first IP Multimedia Subsystem communication service using a first Application Server, receiving a request for a further session corresponding to a further IP Multimedia Subsystem communication service, and forwarding said request to a further Application Server. Said further Application Server is additionally notified that said first communication service is ongoing and of the nature of said first session.

12 Claims, 6 Drawing Sheets

U.S. PATENT DOCUMENTS

| | | | |
|---|---|---|---|
| 2008/0268819 A1* | 10/2008 | Zhu et al. | 455/414.1 |
| 2009/0124246 A1* | 5/2009 | Huh et al. | 455/418 |
| 2009/0144429 A1* | 6/2009 | Astrom | 709/227 |
| 2009/0190573 A1* | 7/2009 | Siegel et al. | 370/352 |
| 2009/0203357 A1* | 8/2009 | Harris et al. | 455/412.1 |
| 2009/0257433 A1* | 10/2009 | Mutikainen et al. | 370/392 |
| 2010/0015958 A1* | 1/2010 | Dell'Uomo et al. | 455/414.1 |
| 2010/0098056 A1* | 4/2010 | Falken et al. | 370/352 |
| 2010/0254370 A1* | 10/2010 | Jana et al. | 370/352 |
| 2011/0072261 A1* | 3/2011 | Thomas et al. | 713/156 |

* cited by examiner

SERVICE ADAPTATION IN AN IP MULTIMEDIA SUBSYSTEM NETWORK

TECHNICAL FIELD

The present invention relates to service adaptation in an IP Multimedia Subsystem network, and in particular, though not necessarily, to the introduction and removal of IP Multimedia Subsystem communication services during an ongoing multimedia session.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services.

IP Multimedia Subsystem (IMS) is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS fits into a mobile network architecture in the case of a Packet Switched (PS) and Circuit Switched (CS) access domains, whilst FIG. 2 illustrates the various interfaces defined within the IMS and between the IMS and cellular and PSTN networks. [NB. IMS can also be deployed over other access technologies (e.g. fixed networks)]. Call/Session Control Functions (CSCFs) operate as SIP proxies with the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if a S-CSCF is not already selected. The I-CSCF receives the required S-CSCF capabilities from the home network's Home Subscriber Server (HSS), and selects an appropriate S-CSCF based on the received capabilities. [It is noted that S-CSCF allocation is also carried for a user by the I-CSCF in the case where the user is called by another party, and the user is not currently allocated an S-CSCF.] When a registered user subsequently sends a session request to the IMS, the P-CSCF is able to forward the request to the selected S-CSCF based on information received from the S-CSCF during the registration process.

Within the IMS Service Network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. The IFCs are received by the S-CSCF from an HSS during the IMS registration procedure as part of a user's User Profile. Some Application servers are IMS communication service specific so, for example, a given Application Server (a PoC AS) will be identified in the IFCs for a Push-to-talk over Cellular (PoC) service, whilst another Application Server (a MMTel AS) will be identified for a multimedia telephony call service. IMS communication services themselves may be identified by IMS communication service identifiers.

FIG. 2 illustrates the IMS Service Control (ISC) interface between an AS and an S-CSCF, as well as other interfaces within the IMS. Although the AS in FIG. 2 is shown as having only a single interface to an S-CSCF, it will be appreciated that in practice the ISC interface will extend across a communication network to which many (or all) of the CSCF servers of a given operator's network are connected, allowing an AS to communicate with all of these CSCFs. [Other entities illustrated in FIG. 1 will be well known to those of skill in the art.]

A further interface (Ut) exists between the AS and the user terminal (TS23.002) although this is not shown in the Figure. The Ut interface enables the user to manage information related to his or her services, e.g. creation and assignment of Public Service Identities, management of authorisation policies that are used for example by "presence" services, conference policy management, etc.

In the case of a communication between two IMS users involving multiple IMS communication services, each IMS communication service is associated with its own SIP signalling and control path. A session involving three IMS communication services is illustrated schematically in FIG. 3. Whilst SIP paths will of course share the same nodes within the IMS core network (e.g. S-CSCFs), they may traverse different nodes within the IMS Service Layer (i.e. ASs).

The implementation of network-based complex services made up of a number of individual IMS communication services, or even the provision of multiple parallel but independent services to individual users, may require the discovery by an IMS AS, involved in the delivery of an IMS communication service, of the nature of other ongoing IMS communication services. Discovery may also be desirable even where a complex service is made up of two services of the same type as it is possible that different invocations of the same service may involve different ASs. However, according to the current IMS implementations, there is no mechanism to support this discovery.

SUMMARY

There is currently no mechanism in the current implementations to allow discovery by an AS (associated with an IMS communication service) of the identity of other ASs currently serving a user. This precludes the AS from invoking service logic to implement interaction between plural IMS communication services/application servers.

It is an object of the present invention to provide a mechanism to enable an IMS AS to identify IMS communication services with which a user is involved, other than the IMS communication service(s) facilitated by the AS itself.

According to a first aspect of the present invention there is provided a method of operating a Call Session Control Function node within an IP Multimedia Subsystem network, the method comprising;

establishing a first session corresponding to a first IP Multimedia Subsystem communication service using a first Application Server;

receiving a request for a further session corresponding to a further IP Multimedia Subsystem communication service and forwarding said request to a further Application Server;

sending a notification to said further Application Server to inform the further Application Server that said first communication service is ongoing and to identify the nature of said further session.

Based upon the information received by the further Application Server, the further Application Server can provide enhanced functionality to users and network operators alike. For example, an Application Server involved in one communication service can cause another concurrent service to be terminated.

A preferred implementation involves including said notification within said request that is forwarded to the further Application Server. This may be optimal from a signalling point of view.

In a preferred embodiment of the invention, said Call Session Control Function receives a service initiation request in respect of a second IMS communication service for said user. The node determines whether a first IMS communication service is already ongoing for the user in a first Application Server and, if so, includes in said service initiation request the 'communication service identifier' for the ongoing first IMS communication service. The node then forwards the service initiation request to a second Application Server associated with the requested second IMS communication service. In a modification to this embodiment, said communication service identifier for the ongoing first IMS communication service is included in a message distinct from said service initiation request, for example a SIP OPTIONS message.

Preferably, said Call Session Control Function node is a Serving Call Session Control Function node allocated to said user. Alternatively however, the Call Session Control Function node may be a Proxy Call Session Control Function node, although this is perhaps not optimal.

In a typical implementation of the invention, said service initiation request is a SIP INVITE message.

In an embodiment of the present invention, the Call Session Control Function node may include an address of the one or more first Application Servers already serving said user. This may be in addition to including the associated communication service identifiers for the ongoing first IMS communication service, or not. In the latter case, the address(es) may implicitly identify the associated IMS communication services. In an alternative embodiment, the address(es) is(are) not provided by the Call Session Control Function node, but are obtained by the second Application Server from a Home Subscriber Server using the communication service identifiers as key(s). Typically, the or each address is an IP address.

A possible extension to the invention allows "backward" notification to the first Application Servers of newly added second IMS communication services. This involves an already linked in first Application Server subscribing to changes in a user's status at the Call Session Control Function node, e.g. using the SIP SUBSCRIBE method. The Call Session Control Function node informs the first Application Server of changes using the SIP NOTIFY method. In an alternative embodiment, the second Application Server may notify the one or more first Application Servers of the newly added second IMS communication service.

Other aspects of the invention are defined in the appended claims.

DETAILED DESCRIPTION

Figure 1:
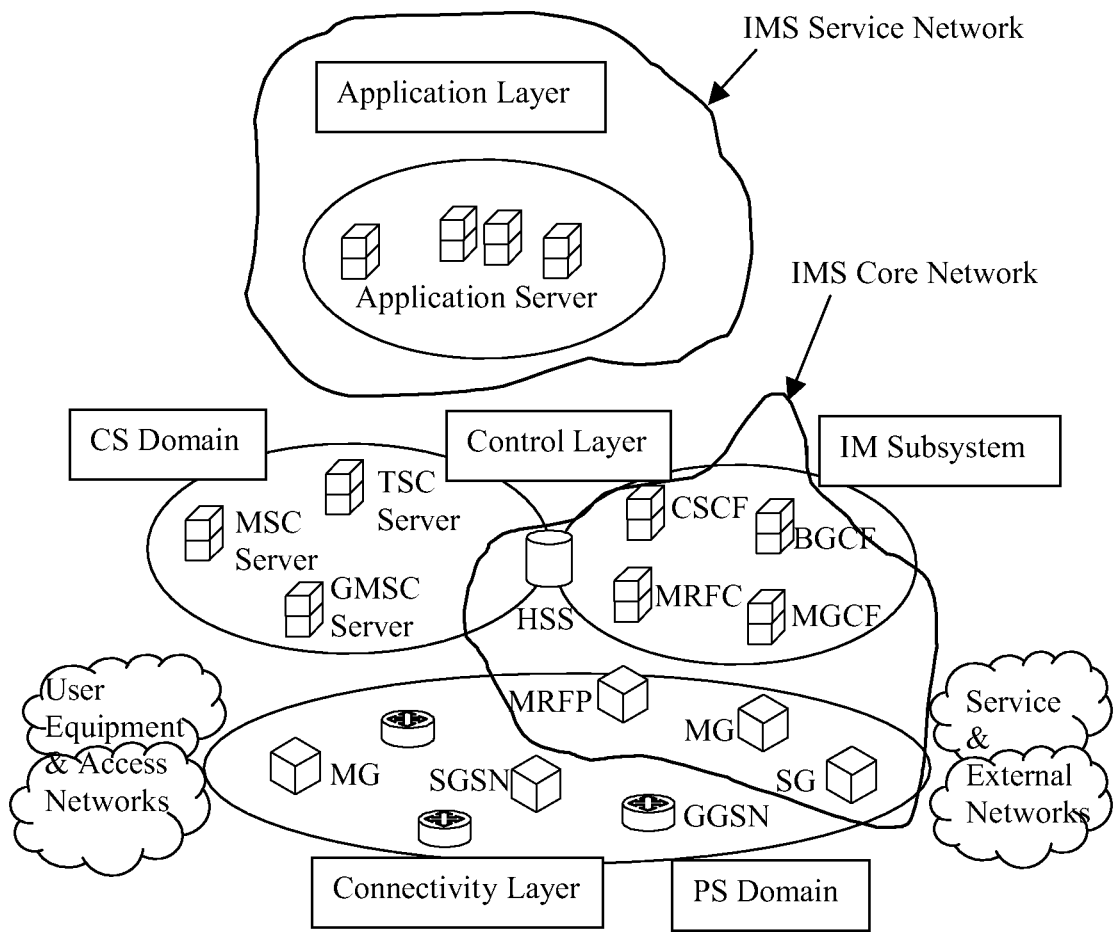
FIG. 1 illustrates schematically the integration of an IP Multimedia Subsystem into a 3G mobile communications system.
Figure 2:
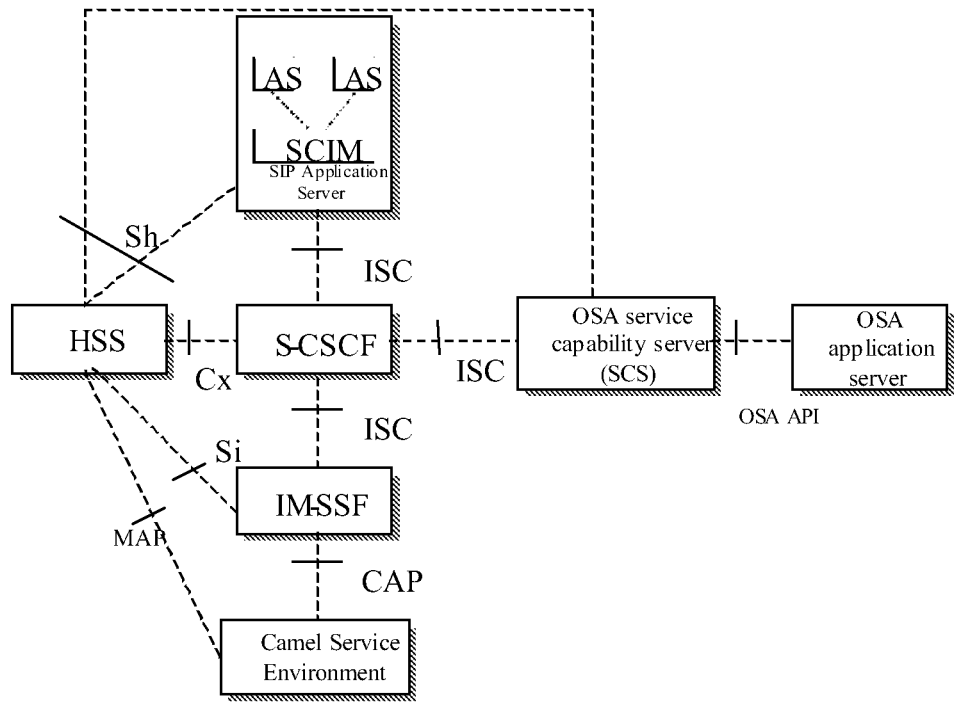
FIG. 2 illustrates schematically certain entities of the IP Multimedia Subsystem including an Application Server and a Serving Call/State Control Function.
Figure 3:
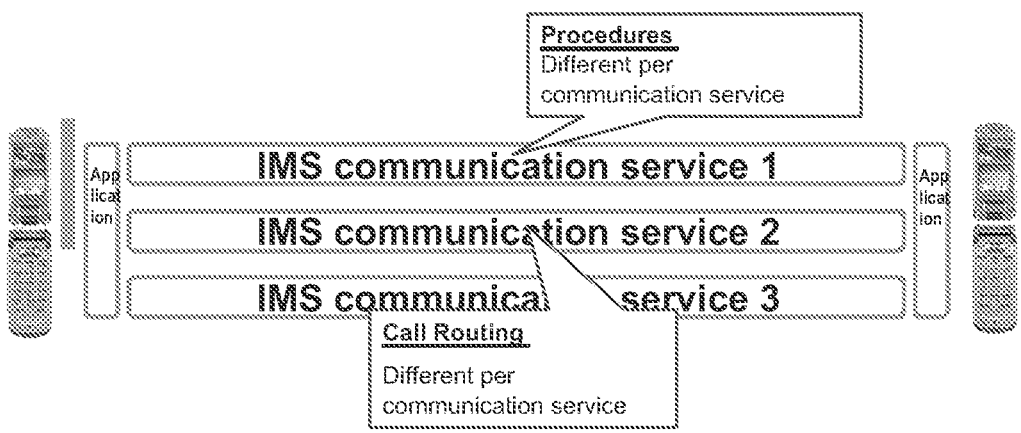
FIG. 3 illustrates schematically a single SIP session involving multiple parallel communication services.
Figure 4:
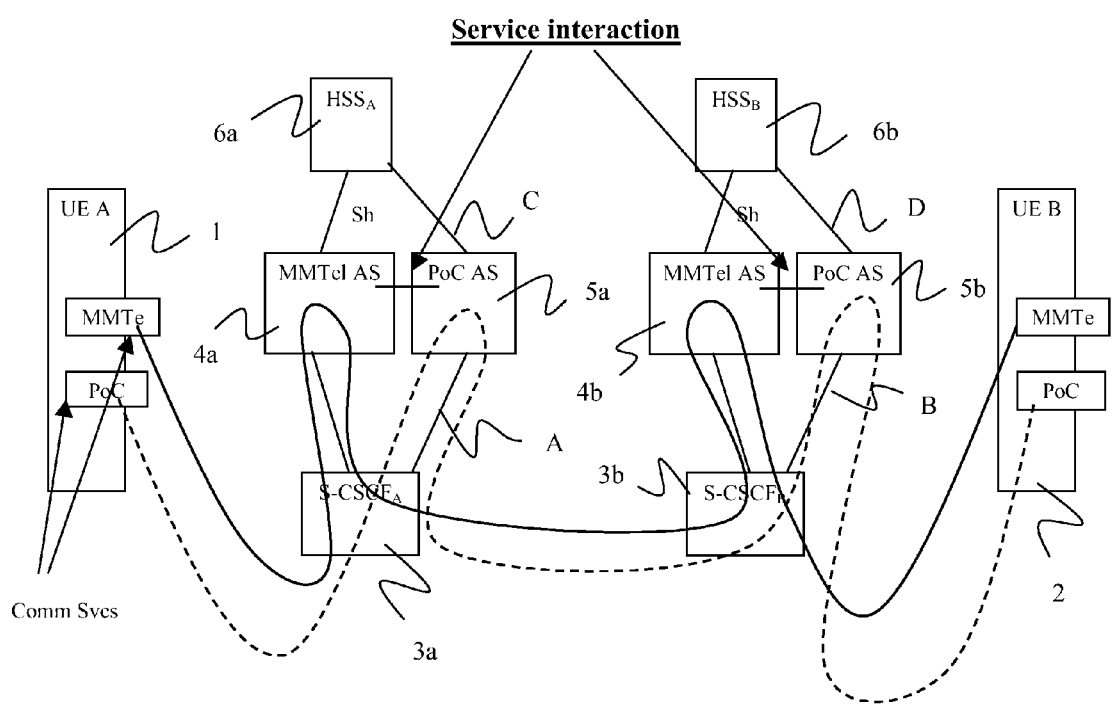
FIG. 4 illustrates schematically the flow paths through the IMS for a multimedia telephony call with text media and for a PoC call.

FIG. 4 illustrates an exemplary interaction between Push-to-Talk over Cellular (hereinafter PoC) and Multimedia Telephony (hereinafter MMTel) communication services within the IP Multimedia Subsystem (IMS). The illustrated user terminals or User Equipment (UE), identified as UE A 1 and UE B 2, are each provided (in software) with an IMS/SIP client as well as a number of IMS applications. In the illustrated example, these applications are a Multimedia telephony (MMTel) application and a Push-to-talk over Cellular (PoC) application. FIG. 4 also illustrates various components within the IMS, with the assumption that the two UEs are served by respective "home" IMS networks. UE A is registered with S-CSCF$_A$ 3a of its home network whilst UE B is served by S-CSCF$_B$ 3b of its home network (3GPP TS 23.228 (section 5.2.2.3). Required P-CSCF and I-CSCF nodes are not illustrated in the Figure.

Considering now IMS communication service establishment, the following steps are performed, although it will be appreciated that, where not expressly stated, establishment steps are essentially as set out in the pre-existing standards.

Figure 5:
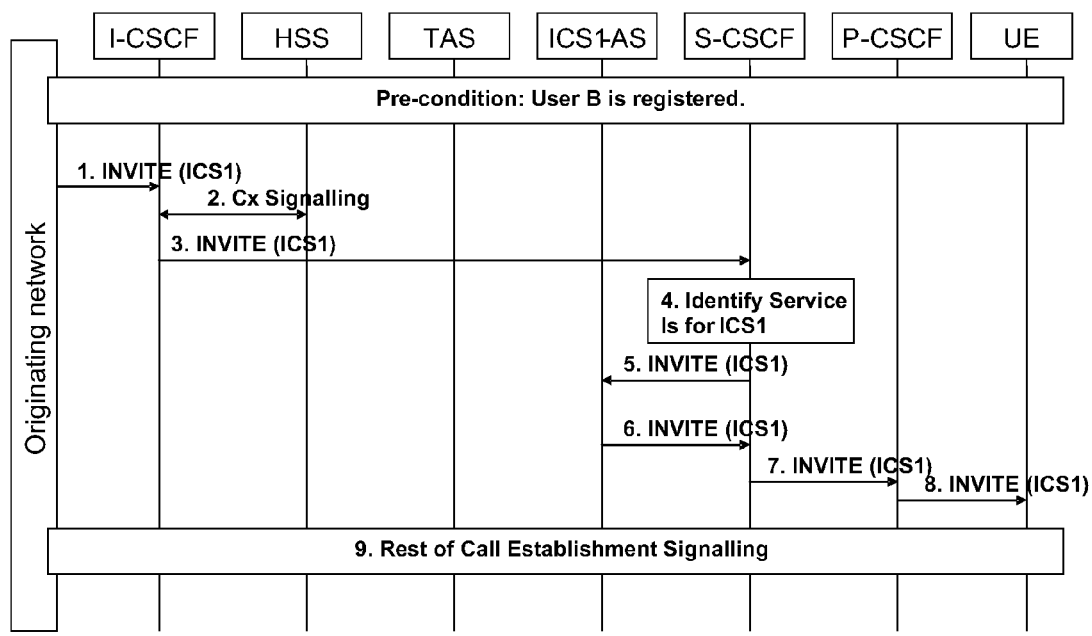
FIG. 5 illustrates an exemplary procedure for establishing a session corresponding to a first IMS communication service.

I. UE A and UE B are engaged in a Multimedia telephony call. This call is established using, for example, the generic procedure illustrated in FIG. 5, details of which are as follows (only the terminating side signalling is shown, with the assumption that the originating side signalling is substantially similar):

1. A SIP INVITE is sent from the originating network towards the I-CSCF. The INVITE contains an indication that this call is for IMS Communication Service 1 (ICS1)—in this example the service is MMTel.
2. The I-CSCF queries the HSS to determine the address of the S-CSCF. The HSS provides the S-CSCF address to the I-CSCF
3. The I-CSCF forwards the INVITE to the S-CSCF address received from the HSS
4. The S-CSCF identifies that this is for IMS Communication Service 1 (ICS1) based upon the information in the INVITE, and using the Initial Filter Criteria (IFCs). The IFC for IMS Communication Service 1 (ICS1) is matched and through this the S-CSCF knows the address of the ICS1-AS server (in this example a MMTel AS) to which the INVITE should be sent.
5. The INVITE is sent to the ICS1-AS server.
6. After the ICS1-AS server has performed the necessary terminating logic, the INVITE is returned to the S-CSCF.
7. The S-CSCF forwards the INVITE to the P-CSCF for the registered contact.
8. The P-CSCF forwards the INVITE to the UE
9. The rest of the session establishment signaling proceeds.

The SIP flow path is overlayed on the structure shown in FIG. 4 as a solid line.

II. At a certain point in time, UE A and UE B decide to initiate a PoC conversation in addition to their ongoing telephony call. This conversation is initiated following the same procedure as for the Multimedia telephony call and involves the sending of a SIP INVITE along the SIP flow path.

III. When the S-CSCF$_A$ and S-CSCF$_B$ evaluate the trigger corresponding to the PoC service, they each add the MMTel communication service identifier to the SIP INVITE, and forward the SIP INVITE to the appropriate PoC AS 5a,5b (Steps A and B in FIG. 4). It is assumed in this case that an identifier of an IMS communication service exists for MMTel; however, one may assume such MMTel as the applicable IMS communication service in the absence of any identifier of an IMS Communication service.

IV. Upon receipt of the SIP INVITE, each PoC AS will issue an Sh Read to the Home Subscriber Server (HSS) 6a, 6b within the same home network (Steps C and D in FIG. 4), in order to retrieve the address of the corresponding MMTel AS. The search key in this read is (or is based on) the MMTel communication service either because MMTel communication service identifier has been received, or because the lack of an IMS communication service identifier, which is understood as Multimedia Telephony. The PoC ASs return the INVITE to the respective S-CSCFs (likely without keeping the received MMTel communication service identifier) and the PoC related flow path illustrated by the broken line in FIG. 4 is established.

V. Once a PoC AS knows the address of the associated MMTel AS, both entities can interact to provide a value added service to the users. An example of interaction could be that MMTel AS decides to finish the ongoing Multimedia telephony call.

It might be useful in some cases to retain the MMTel communication service identifier in the INVITE as this might be useful to another IMS network.

In the general case, an S-CSCF receiving a SIP INVITE will add all IMS communication service identifiers corresponding to already established services into the INVITE. The ASs use this information to enhance the functionality that they provide. For example, a PoC AS may know that when a PoC service is terminated, it must terminate any ongoing MMTel services, but not an ongoing messaging service.

Figure 6:
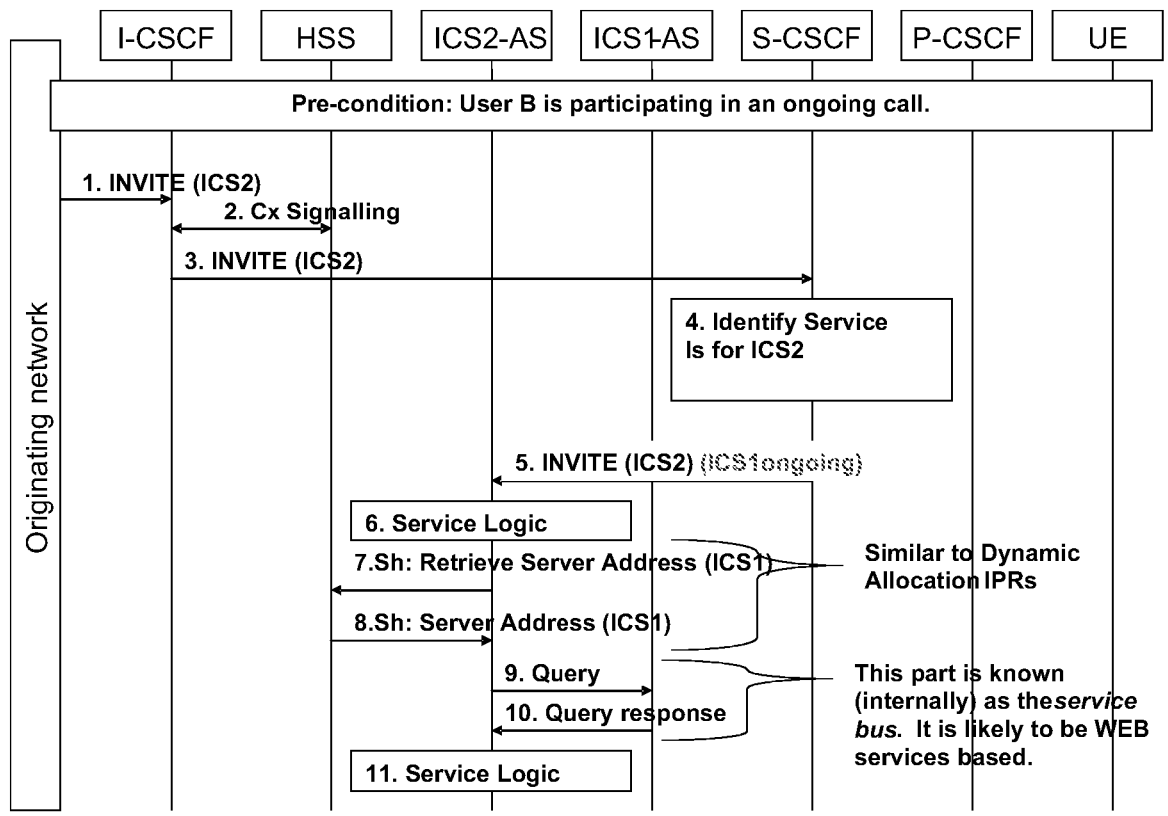
FIG. 6 illustrates an exemplary procedure for establishing a subsequent session corresponding to a second IMS communication service.

This procedure associated with steps II to IV is illustrated in FIG. 6 as follows (where again the procedure is illustrated generally for an IMS communication service ICS2 handled by a second AS, ICS2-AS):

1. An INVITE is sent from the originating network towards the I-CSCF. The INVITE contains an indication that this session is for IMS Communication Service 2 (ICS2)—in this example the service is PoC.
2. The I-CSCF queries the HSS to determine the address of the S-CSCF. The HSS provides the S-CSCF address to the I-CSCF
3. The I-CSCF forwards the INVITE to the S-CSCF address that was received from the HSS
4. The S-CSCF identifies that this is for IMS Communication Service 2 (ICS2) based upon the information in the INVITE, and using the Initial Filter Criteria (IFCs). The IFC for IMS Communication Service 2 (ICS2) is matched and through this the S-CSCF knows the address of the ICS2-AS (in this example a PoC AS) that the INVITE should be sent to.
5. The INVITE is sent to the ICS2-AS, and includes information about which other IMS communication services are ongoing: ICS1—in this example, information about MMTel. In particular, this information may include an identifier of the ICS1-AS.
6. Based upon receiving information about ongoing services, the ICS2-AS decides that it needs to contact the ICS1-AS—in this example, the PoC AS needs to contact the MMTel AS.
7. It is assumed that the ICS1-AS for the subscriber is dynamically allocated and the address of the AS stored in a central repository such as the HSS. The ICS2-AS must therefore query the HSS
8. The HSS provides the address of the ICS1-AS to ICS2-AS.
9-10. The ICS2-AS contacts the ICS1-AS for service interaction reasons. This may be to obtain information such as the state of the ICS1 session, the type of session, etc to enable the ICS2-AS to decide how to progress the requested ICS2 session establishment.
11. Based upon the response in 10, the ICS2-AS decides whether to progress the session or not. Subsequently the rest of the session may be established.

Figure 7:
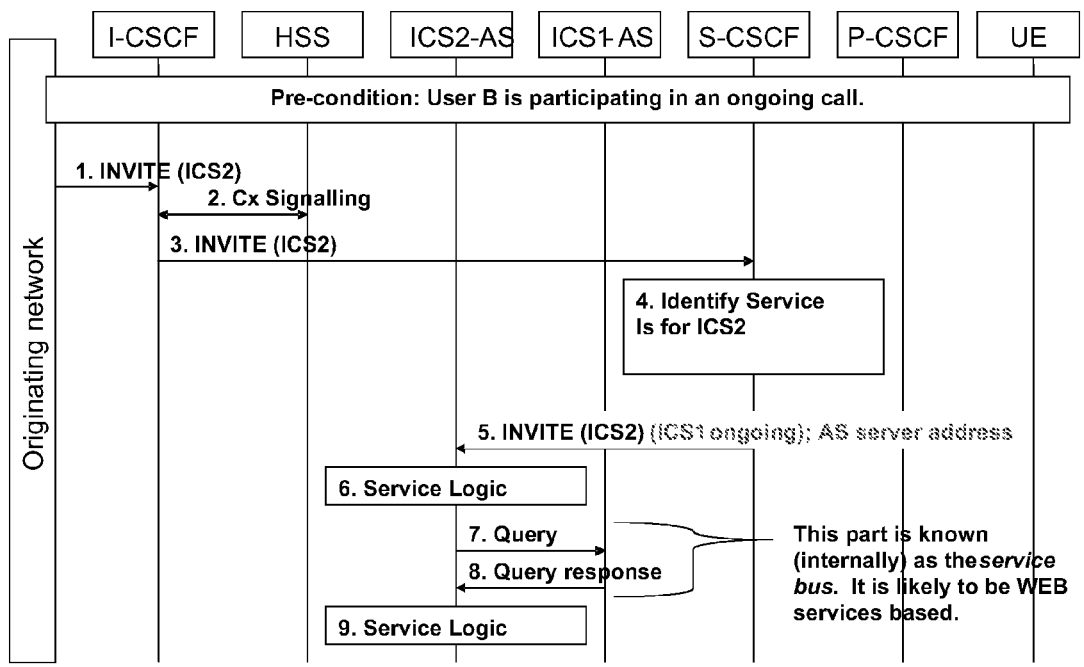
FIG. 7 illustrates an alternative exemplary procedure for establishing a subsequent session corresponding to a second IMS communication service

FIG. 7 illustrates an alternative procedure for establishing the second IMS communication service (ICS2). This procedure differs from that illustrated in FIG. 6 in that the S-CSCF includes in the INVITE forwarded to the ICS2-AS the address of the ICS1-AS, in addition to the associated IMS communication service identifier ICS1. Thus, there is no need for the ICS2-AS to query the HSS for this address, and the ICS2-AS can proceed immediately to implement the service interaction logic.

It will be appreciated that ASs already provisioning services to a user when a new service is provisioned, may be informed of the new service by allowing the ASs to subscribe to changes in subscriber data at the S-CSCF. Thus, each time a new service is provisioned, the ASs will receive a SIP NOTIFY message containing the appropriate IMS communication service identifier.

The procedures described here can be applied to implement different levels of interaction between IMS Communication Services. For example:
  Service Precedence in IMS: One of a plurality of ongoing IMS Communication Service sessions could be interrupted or maintained if a session for another IMS Communication Service is initiated. For example, a Push-to-talk over Cellular (PoC) session could be interrupted if a Multimedia Telephony (MMTel) session is established or vice versa.

Operator-controlled interaction in IMS: The network operator could decide which combinations of IMS Communication Services are allowed and which not, and could even apply different charging mechanisms to different combinations of IMS Communication Services (e.g. a chat session between two users is always charged except if the same two users have a gaming session ongoing when the chat session is established)

Advanced interaction between IMS Communication Services controlled by service logic in IMS: New value-added services could be implemented and offered by the network operator to the end-users, based on a service logic which could implement extended capabilities invoked only when different IMS Communication Service sessions are established (e.g. certain capabilities of a gaming service are launched, when an MMTel or a PoC session are established)

It will be appreciated by the person of skill in the art that various modifications may be made to the above described embodiments without departing from the scope of the present invention.

The invention claimed is:

1. A method of operating a Call Session Control Function node within an IP Multimedia Subsystem (IMS) network, the method comprising;
    establishing a first session corresponding to a first IMS communication service for a user using a first Application Server;
    receiving a request for a second session corresponding to a second IMS communication service for the user, wherein said second IMS communication service is other than the first IMS communication service and is to be run in a second Application Server other than the first Application Server, and forwarding said request to the second Application Server; and
    sending a notification to said second Application Server that said first IMS communication service is ongoing for the user and to identify the nature of said first session.

2. The method according to claim 1, said Call Session Control Function node determining, upon receipt of said request, whether the first IMS communication service is already ongoing for the user in the first Application Server and, if so, including in said notification an identifier of said first IMS communication service.

3. The method according to claim 1, wherein said notification is included within said request that is forwarded to the second Application Server.

4. The method according to claim 1, said request being a Session Initiation Protocol (SIP) INVITE message.

5. The method according to claim 1, said notification being a SIP OPTIONS message.

6. The method according to claim 1, said Call Session Control Function node being a Serving Call Session Control Function node allocated to a the user.

7. The method according to claim 1, said notification including an address of said first Application Server.

8. A method of operating a Serving Call Session Control Function node within an IP Multimedia Subsystem (IMS) network, the method comprising:
    establishing a first session corresponding to a first IMS communication service for a user, using a first Application Server;
    receiving a Session Initiation Protocol (SIP) INVITE message in respect of a second IMS communication service for the user, wherein said second IMS communication service is other than the first IMS communication service and is to be run in a second Application Server other than the first Application Server;
    including in said SIP INVITE message a communication service identifier identifying the nature of the ongoing first IMS communication service; and
    forwarding the SIP INVITE message to said second Application Server associated with the requested second IMS communication service.

9. A method of controlling the provision of communication services to users within an IP Multimedia Subsystem (IMS), the method comprising:
    establishing a first session corresponding to a first IMS communication service for a user, using a first Application Server;
    receiving a request for a second session corresponding to a second IMS communication service for said user, wherein said second IMS communication service is other than the first IMS communication service and is to be run in a second Application Server other than the first Application Server;
    sending a notification to said second Application Server allocated to said user in order to provide said second IMS communication service, the notification identifying to, or being useable by, the second Application Server to identify said first IMS communication service; and
    receiving said notification at said second Application Server, using the information contained therein to modify the provision of the second IMS communication service and/or to modify the execution of said first IMS communication service.

10. An IP Multimedia Subsystem (IMS) Application Server for providing an IMS communication service to users, the Application Server comprising:
    an interface for receiving from a Call Session Control Function node a request to provide an IMS communication service to a user and an identification identifying one or more other IMS communication services currently provided to said user by one or more other Application Servers, wherein
    the IMS Application Server being configured to use said identification to modify the provision of the requested IMS communication service or anyone amongst the identified one or more other IMS communication services ongoing for said user.

11. An Application Server according to claim 10, wherein said identification identifies the one or more other Application Servers involved in provisioning said one or more other IMS communication services.

12. An Application Server according to claim 11, wherein said identification is one or more addresses of the one or more other Application Servers involved in provisioning said other IMS communication services.

* * * * *

UNITED STATES PATENT AND TRADEMARK OFFICE
CERTIFICATE OF CORRECTION

PATENT NO. : 8,477,763 B2  
APPLICATION NO. : 12/518631  
DATED : July 2, 2013  
INVENTOR(S) : Pallares-Lopez et al.

Page 1 of 1

It is certified that error appears in the above-identified patent and that said Letters Patent is hereby corrected as shown below:

On Title Page 2, item (56), under "U.S. PATENT DOCUMENTS", in Column 2, Line 3, delete "Falken et al." and insert -- Falkena et al. --, therefor.

In the Specification

In Column 3, Line 16, delete "comprising;" and insert -- comprising: --, therefor.

In Column 5, Line 10, delete "I-CSCF" and insert -- I-CSCF. --, therefor.

In Column 5, Line 12, delete "HSS" and insert -- HSS. --, therefor.

In Column 5, Line 25, delete "UE" and insert -- UE. --, therefor.

In Column 6, Line 15, delete "I-CSCF" and insert -- I-CSCF. --, therefor.

In Column 6, Line 17, delete "HSS" and insert -- HSS. --, therefor.

In Column 6, Line 37, delete "HSS" and insert -- HSS. --, therefor.

In Column 7, Line 13, delete "established)" and insert -- established). --, therefor.

In Column 7, Line 22, delete "established)" and insert -- established). --, therefor.

In the Claims

In Column 8, Line 54, in Claim 11, delete "An Application" and insert -- The Application --, therefor.

In Column 8, Line 58, in Claim 12, delete "An Application" and insert -- The Application --, therefor.

Signed and Sealed this  
Fifth Day of November, 2013

Teresa Stanek Rea  
*Deputy Director of the United States Patent and Trademark Office*